(12) United States Patent
Kim

(10) Patent No.: US 6,966,268 B2
(45) Date of Patent: Nov. 22, 2005

(54) CENTRIFUGAL COMBUSTION METHOD USING AIR-FLOW IN A FURNACE

(75) Inventor: Jiwon Kim, Kyongbuk (KR)

(73) Assignee: CDS Global Co., Ltd., (KR)

( * ) Notice: Subject to any disclaimer, the term of this patent is extended or adjusted under 35 U.S.C. 154(b) by 66 days.

(21) Appl. No.: 10/432,450

(22) PCT Filed: Aug. 11, 2001

(86) PCT No.: PCT/KR01/01373

§ 371 (c)(1),
(2), (4) Date: Nov. 12, 2003

(87) PCT Pub. No.: WO02/42687

PCT Pub. Date: May 30, 2002

(65) Prior Publication Data

US 2004/0081929 A1  Apr. 29, 2004

(30) Foreign Application Priority Data

Nov. 22, 2000 (KR) .................. 10-2000-0069748

(51) Int. Cl.$^7$ .......................... F23L 1/00; F23L 15/00
(52) U.S. Cl. ................ 110/348; 110/315; 110/302; 110/305; 110/254
(58) Field of Search ................ 110/315, 316, 302, 110/308, 305, 348, 264, 254, 213; 431/243, 431/11

(56) References Cited

U.S. PATENT DOCUMENTS

| | | | | | |
|---|---|---|---|---|---|
| 1,809,270 A | * | 6/1931 | Gleichmann | ........... | 122/235.11 |
| 2,214,495 A | * | 9/1940 | Yates | ........... | 110/287 |
| 2,936,724 A | * | 5/1960 | Bishop | ........... | 110/254 |
| 4,580,505 A | * | 4/1986 | Golden | ........... | 110/302 |

FOREIGN PATENT DOCUMENTS

| | | |
|---|---|---|
| JP | 05-180427 A | 7/1993 |
| JP | 07-233925 A | 9/1995 |
| JP | 07-293839 A | 11/1995 |
| JP | 08-014525 A | 1/1996 |

* cited by examiner

*Primary Examiner*—Kenneth Rinehart
(74) *Attorney, Agent, or Firm*—The Webb Law Firm

(57) ABSTRACT

This invention, Centrifugal and Divided Space combustion method, need to install a cylindrical fuel pot, the first combustion chamber, the second combustion chamber and an exhaust pot. It also needs to install the upper and the lower pots outside the first combustion chamber and the fuel pot in order to have the lower and the upper air paths inside the outer pots. One or several ventilator(s) to make air-flow is tangentially connected to the upper and the lower air paths at the lower part of the upper outer pot. And several air-flow control devices should be located at the upper part of the upper air path. Thus, the invention is composed to realize the complete combustion only with the air supply into the furnace. In this case, the space in the furnace is divided into many combustive sectors by the air-flow.

4 Claims, 9 Drawing Sheets

CENTRIFUGAL COMBUSTION METHOD USING AIR-FLOW IN A FURNACE

BACKGROUND OF THE INVENTION

1. Field of the Invention

The present invention relates, in general, to a centrifugal combustion method using air-flow in a furnace and, in particular, to a centrifugal combustion method using air-flow in a furnace, in which combustibles such as low-calorie wastes with high moisture content, high-calorie plastics and rubbers with low moisture content, and high-calorie waste liquid are completely and rapidly combusted at high temperature by only supplying air into the furnace without auxiliary devices and fuel while a space in the furnace is divided into many combustive sectors by air-flows due to a centrifugal force of air under high pressure rapidly supplied to the furnace and revolved in high speed in the furnace.

2. Description of the Related Art

A conventional method for combusting wastes or waste oil, comprises the steps of supplying combustibles into a combustion chamber in a furnace; igniting combustibles in the combustion chamber with the use of an ignition burner; combusting combustibles with cool air directly supplied to an upper, a mid, and a lower part of the combustion chamber.

However, the conventional method has disadvantages in that high-calorie, low-calorie, and wet wastes are incompletely combusted, and combustion efficiency is low because wastes are combusted with only cool air supplied through a ventilator. Incompletely combusted combustibles remain or end up in a landfill, and so resources are wasted and an environment is polluted. In addition, incomplete combustion of combustibles causes various toxic substances fatal to humans, such as dioxin as well as carbon dust to be emitted into the atmosphere, and the burner is continuously operated and auxiliary fuel (e.g. diesel fuel) is additionally used because incompletely combusted remains should be again combusted, thereby the cost of fuel is high, combustion time is long, and combustion efficiency is lowered.

Furthermore, other disadvantages of the conventional method are that a special burner capable of being used at high temperatures is needed, air is supplied to the furnace under high pressure, and refractory bricks should be constructed inside of the furnace because combustibles are combusted at high temperature, and so combustion cost becomes high. Particularly, a combustion chamber made of metals does not endure high temperatures and thus the chamber is eroded, thereby durability of the furnace is reduced.

SUMMARY OF THE INVENTION

Accordingly, the present invention has been made keeping in mind the above problems occurring in the prior art, and an object of the present invention is to provide a centrifugal combustion method in which combustibles are completely combusted at 1500 to 1900° C. by air circulation without any additional device or catalyst.

Another object of the present invention is to provide a centrifugal combustion method, in which low-calorie fuel is sufficiently combusted without auxiliary fuel and about 100% of heat produced during combustion of the low-calorie fuel is utilized.

It is still another object of the present invention to provide a centrifugal combustion method, in which high-calorie fuel is sufficiently combusted without auxiliary fuel and about 100% of heat produced during combustion of the high-calorie fuel is utilized.

It is yet another object of the present invention to provide a centrifugal combustion method, in which wet fuel or waste containing a humidity of 100% or less is sufficiently combusted without auxiliary fuel and heat produced during combustion of the wet fuel or waste containing a humidity of 100% or less is sufficiently utilized.

It is a further object of the present invention to provide a centrifugal combustion method, in which combustibles are completely combusted in the same size combustion chamber as a conventional furnace (incinerator) at a speed several times quicker than a conventional combustion method.

Based on the present invention, the above objects can be accomplished by provision of a furnace comprising a cylindrical fuel tank; a cylindrical first combustion chamber; a cylindrical second combustion chamber; a cylindrical exhaust tub; an upper and a lower outer tub wrapping the first combustion chamber and the fuel tank such that spaces are formed between the upper outer tub and the first combustion chamber, and between the lower outer tub and the fuel tank; one or several ventilator(s) connected to a lower part of the upper outer tub such that the ventilator is tangentially communicated with a space between, the first combustion chamber and the upper outer tub, and to an upper part of the lower outer tub through air connection pipe(s) such that the ventilator is tangentially communicated with a space between the fuel tank and the lower outer tub; a plurality of air-flow control devices positioned at an upper part of the space between the first combustion chamber and the upper outer tub.

In the furnace, combustibles are completely and rapidly combusted at high temperature while a space in the furnace is divided into many combustive sectors by air-flows owing to a centrifugal force of air under high pressure rapidly supplied to the furnace and revolved at high speed in the furnace.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
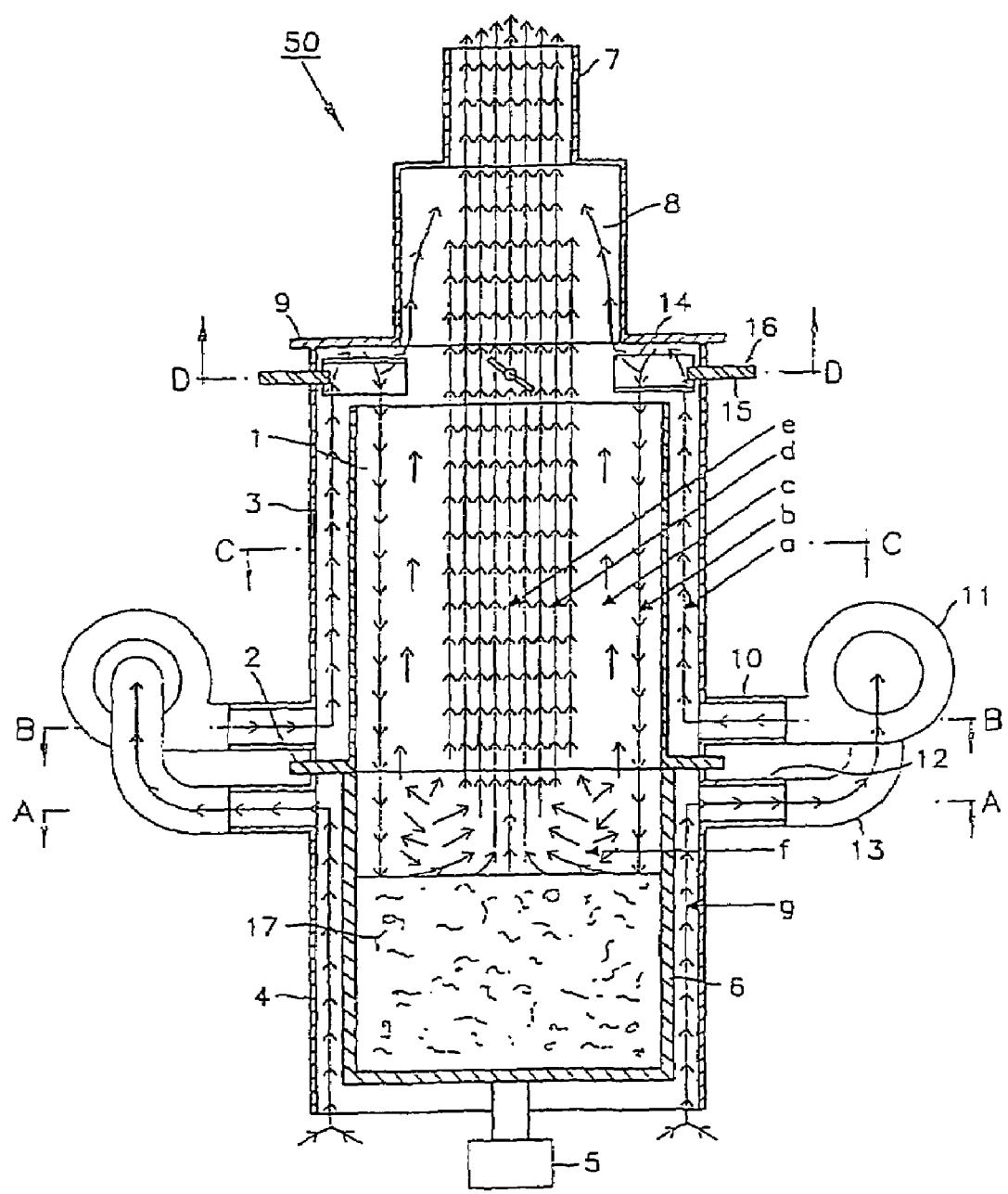
FIG. 1 is a longitudinal sectional view of a furnace according to the present invention, with an air-flow inside of the furnace being shown.
Figure 2A:
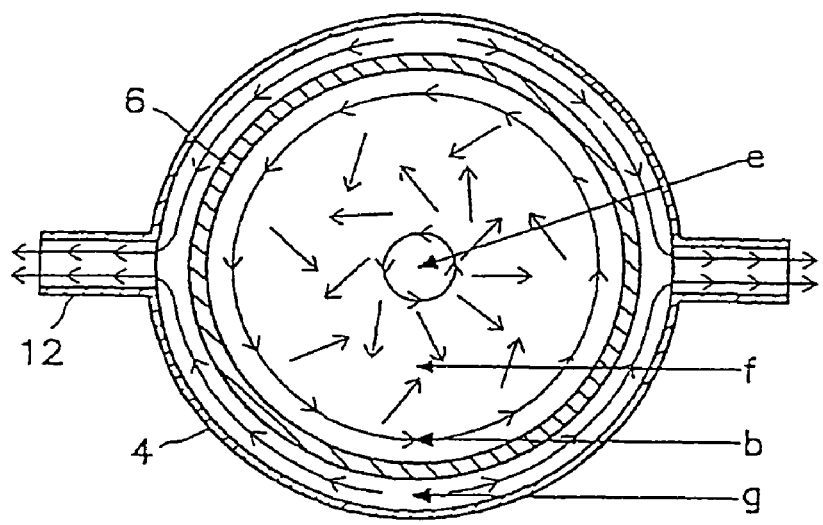
FIG. 2a is a transverse sectional view of the furnace taken along the line A—A of FIG. 1, with the air-flow inside of the furnace being shown.
Figure 2B:
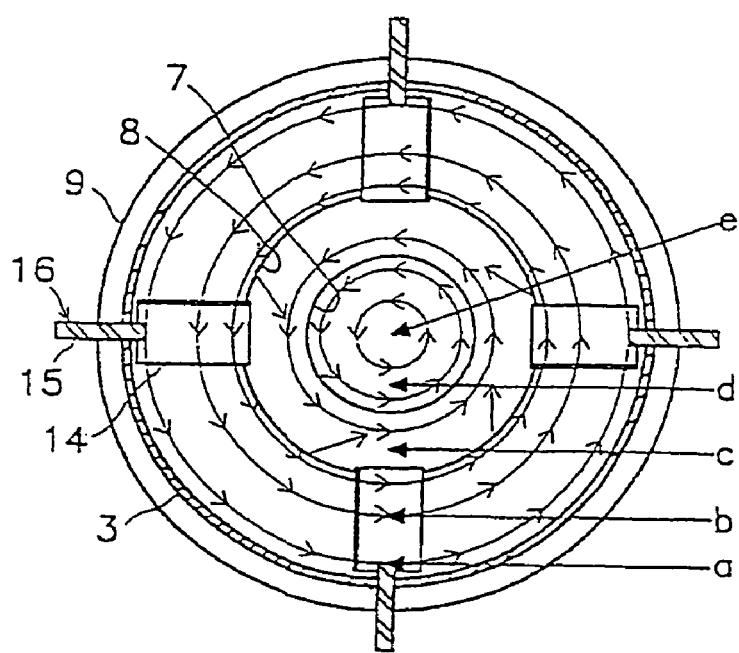
FIG. 2b is a transverse sectional view of the furnace taken along the line B—B of FIG. 1, with the air-flow inside of the furnace being shown.
Figure 2C:
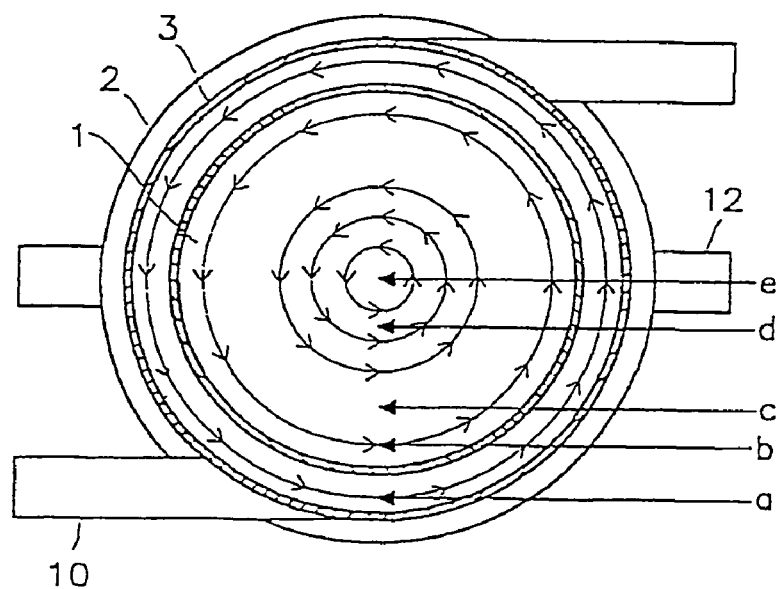
FIG. 2c is a transverse sectional view of the furnace taken along the line C—C of FIG. 1, with the air-flow inside of the furnace being shown.
Figure 2D:
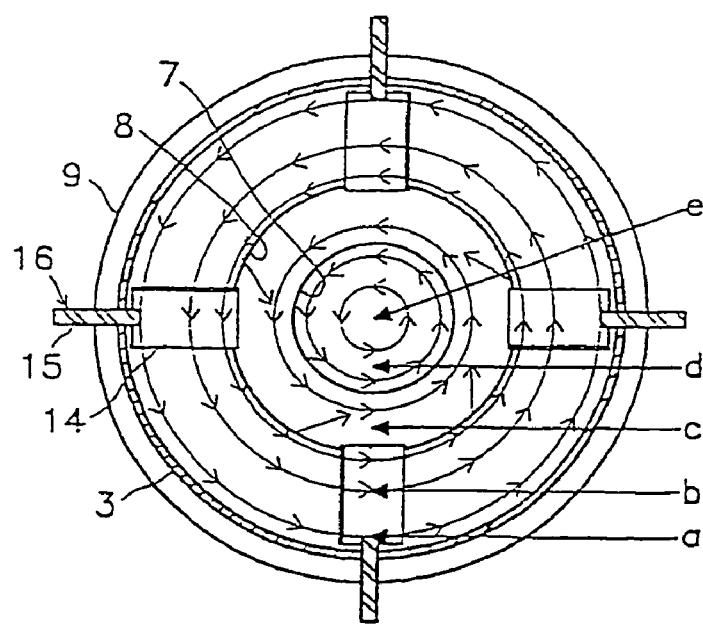
FIG. 2d is a transverse sectional view of the furnace taken along the line D—D of FIG. 1, with the air-flow inside of the furnace being shown.
Figure 3:
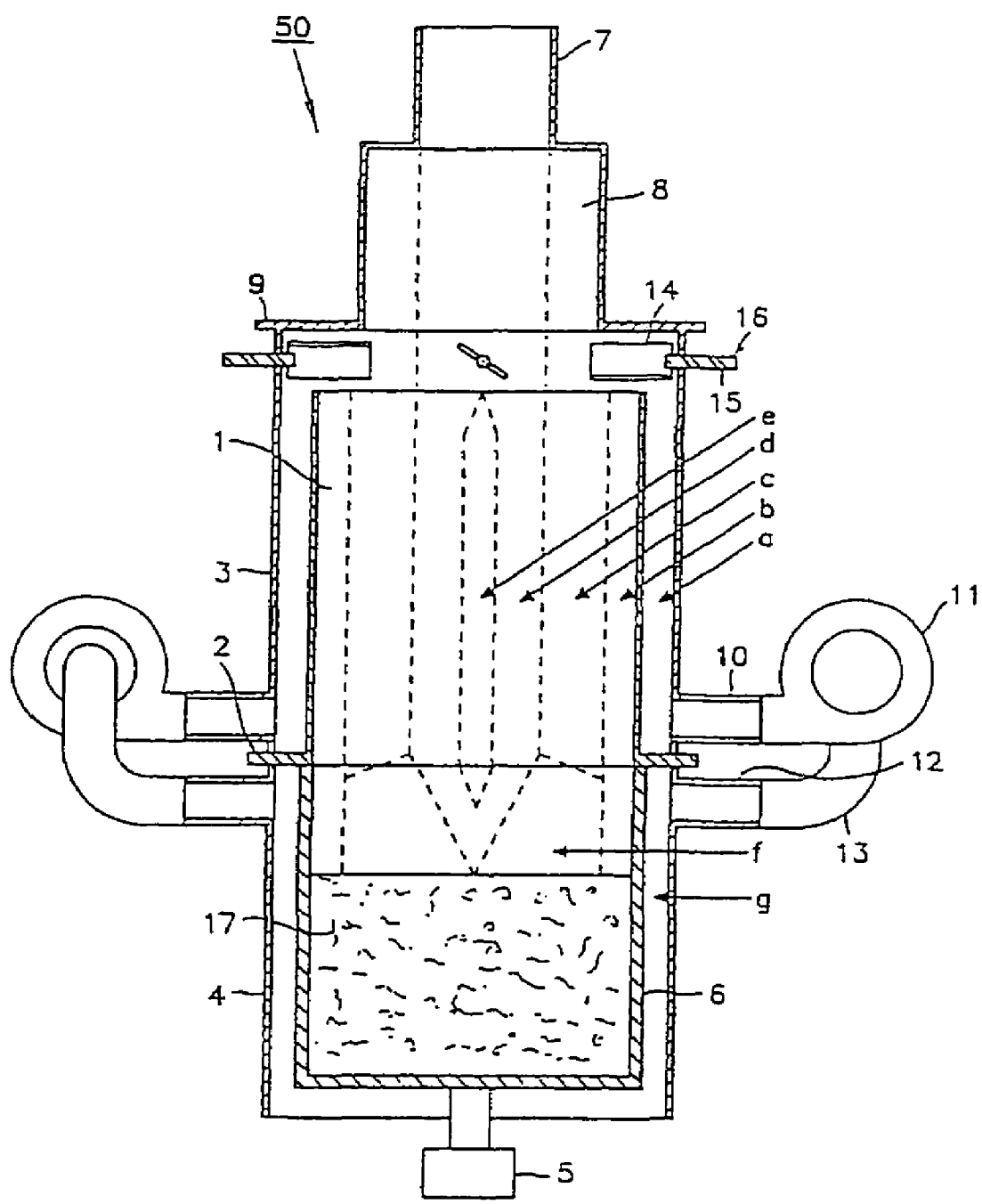
FIG. 3 is a longitudinal sectional view of the furnace according to the present invention, with a plurality of combustive-sectors divided by the air-flow being shown.
Figure 4A:
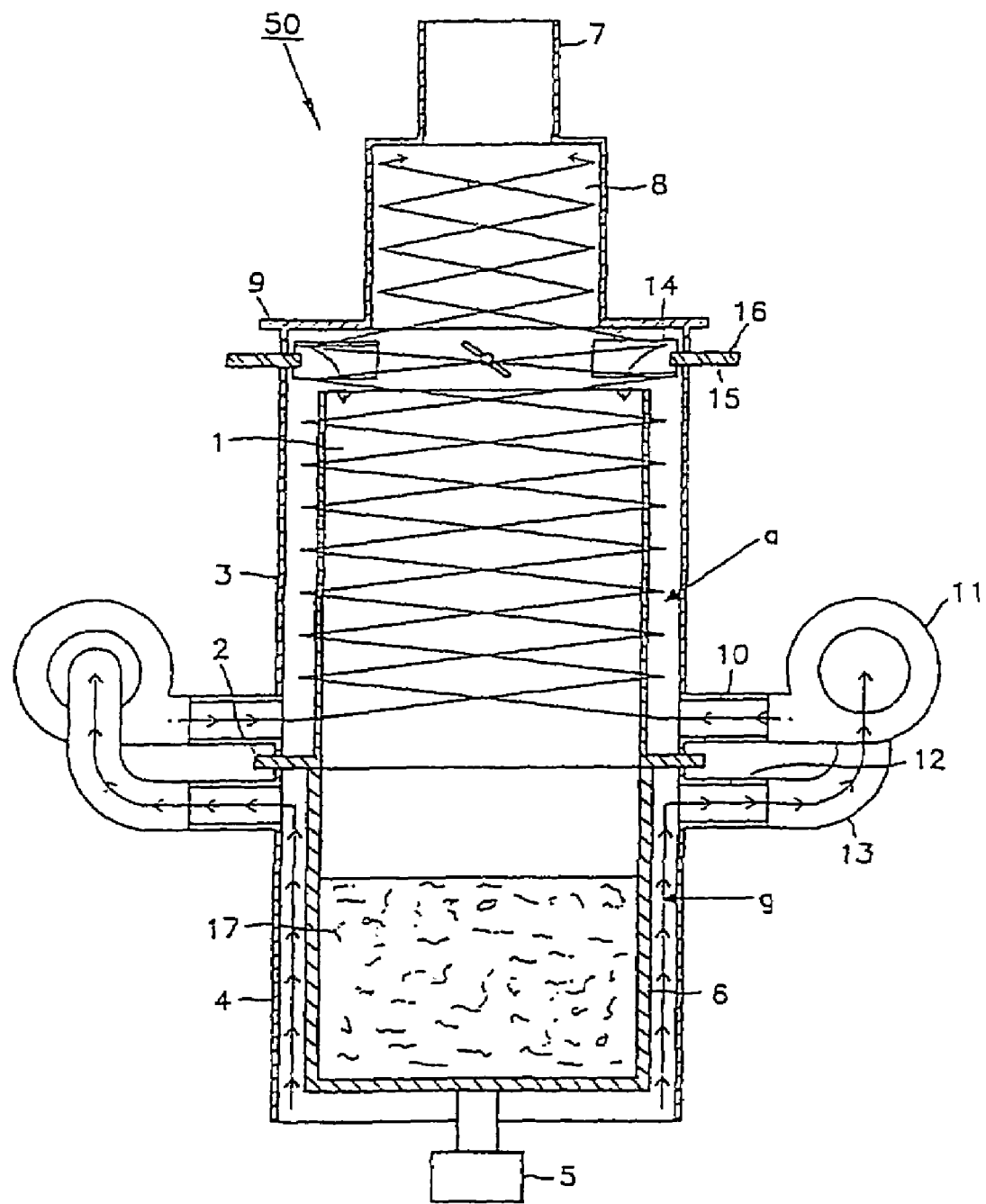
FIG. 4a is a longitudinal sectional view of the furnace with the pre-heated air-flow in a and g parts of the furnace being shown.
Figure 4B:
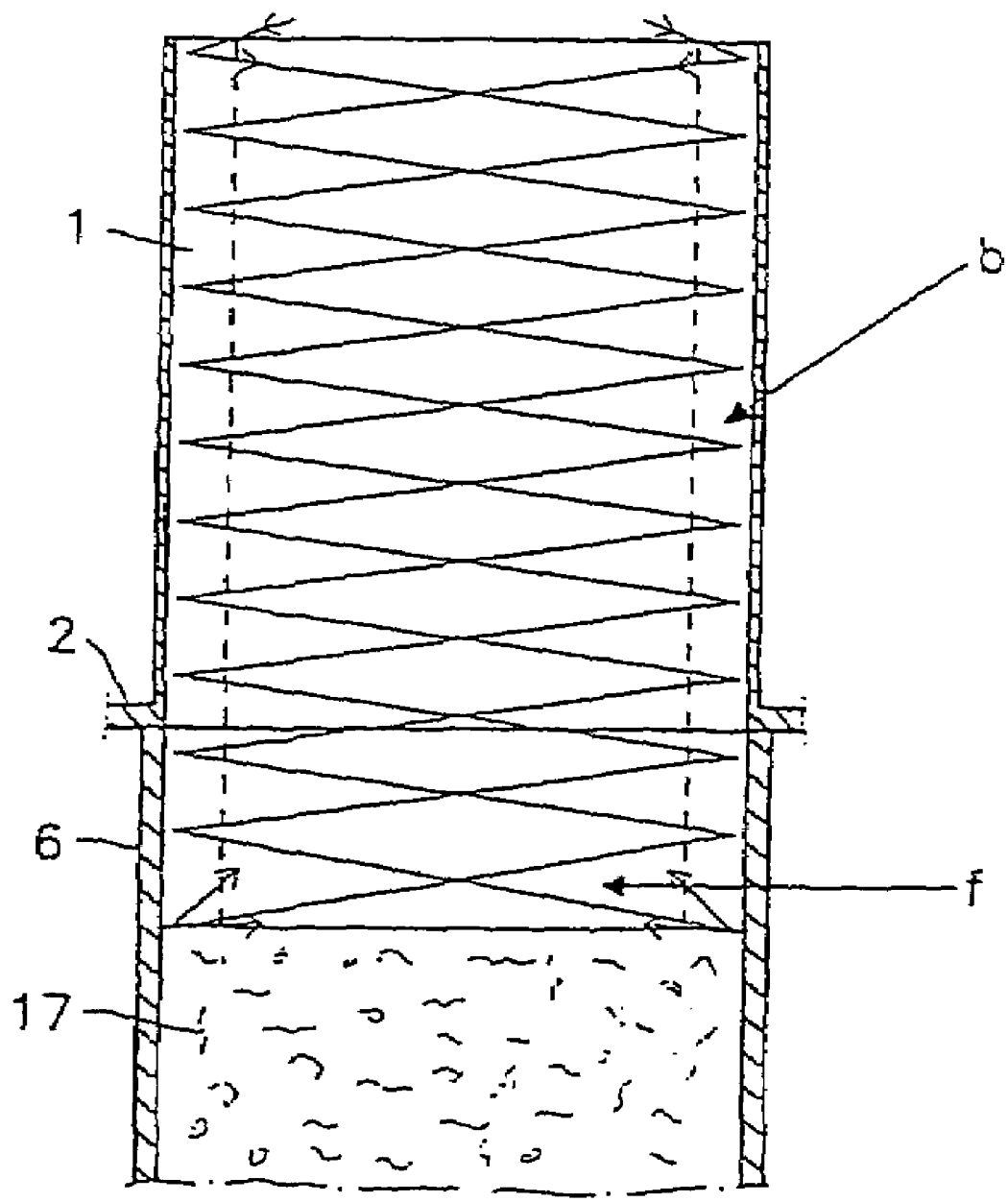
FIG. 4b is a longitudinal sectional view of a portion of the furnace with the pre-heated air-flow in b part of the furnace being shown.
Figure 4C:
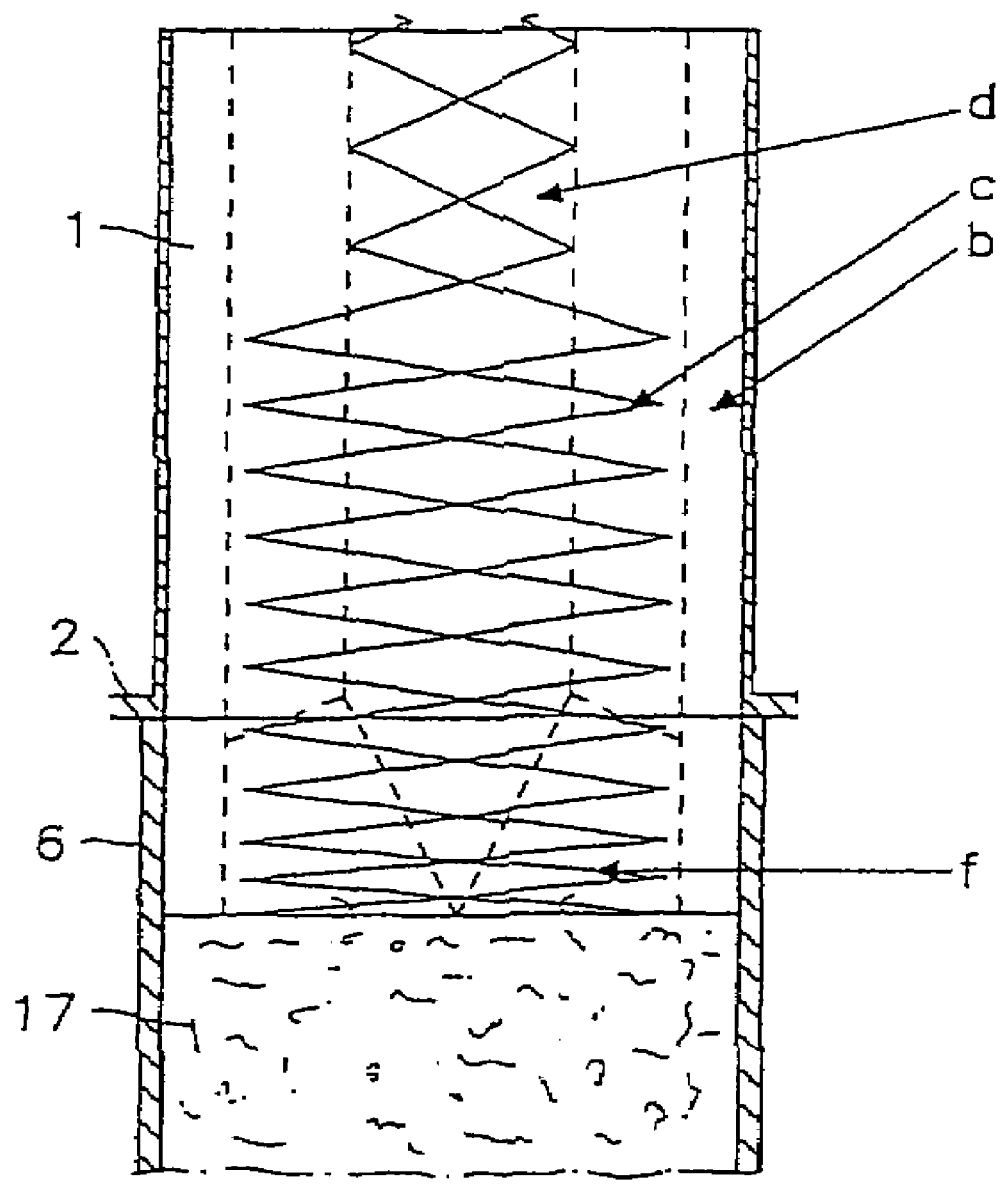
FIG. 4c is a longitudinal sectional view of a portion of the furnace with an exhaust air-flow in c and f parts of the furnace being shown.
Figure 4D:
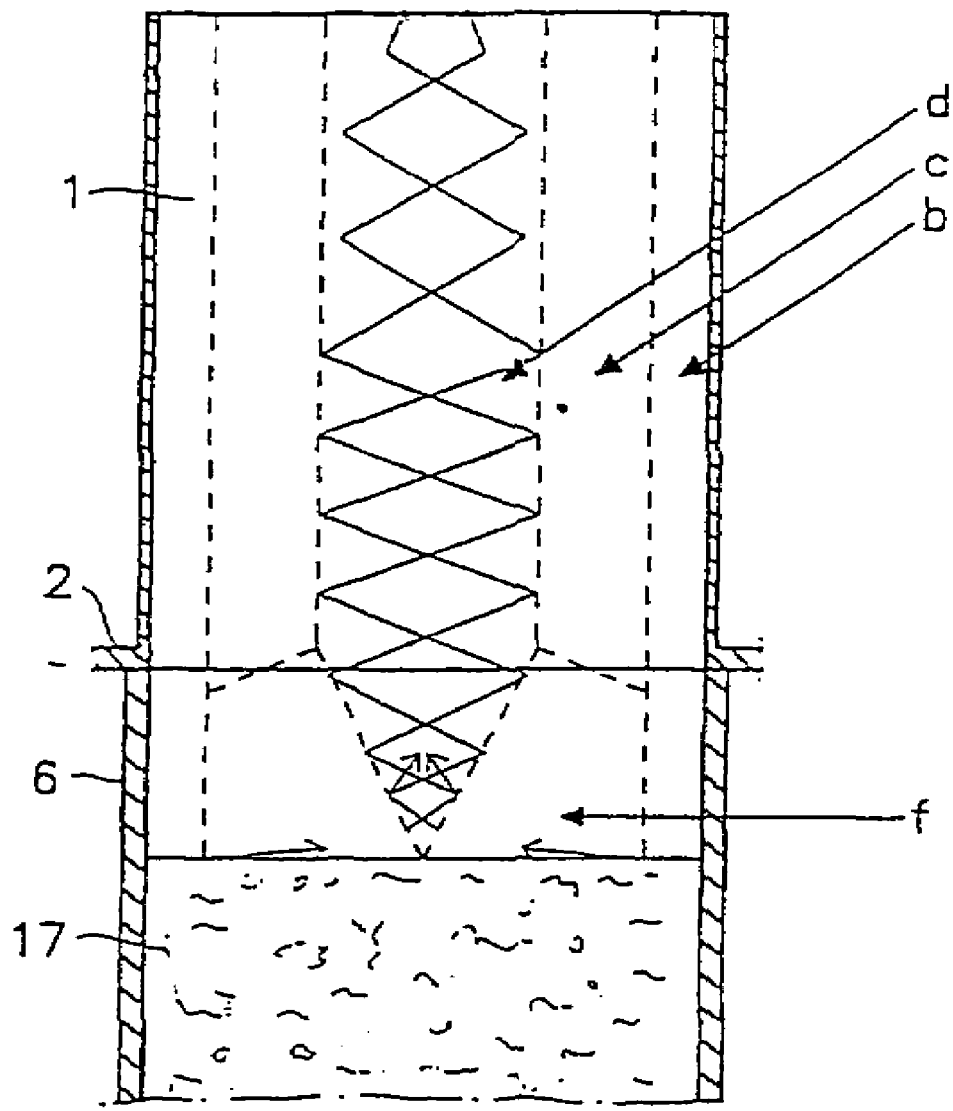
FIG. 4d is a longitudinal sectional view of a portion of the furnace with the exhaust air-flow in d part of the furnace being shown.
Figure 4E:
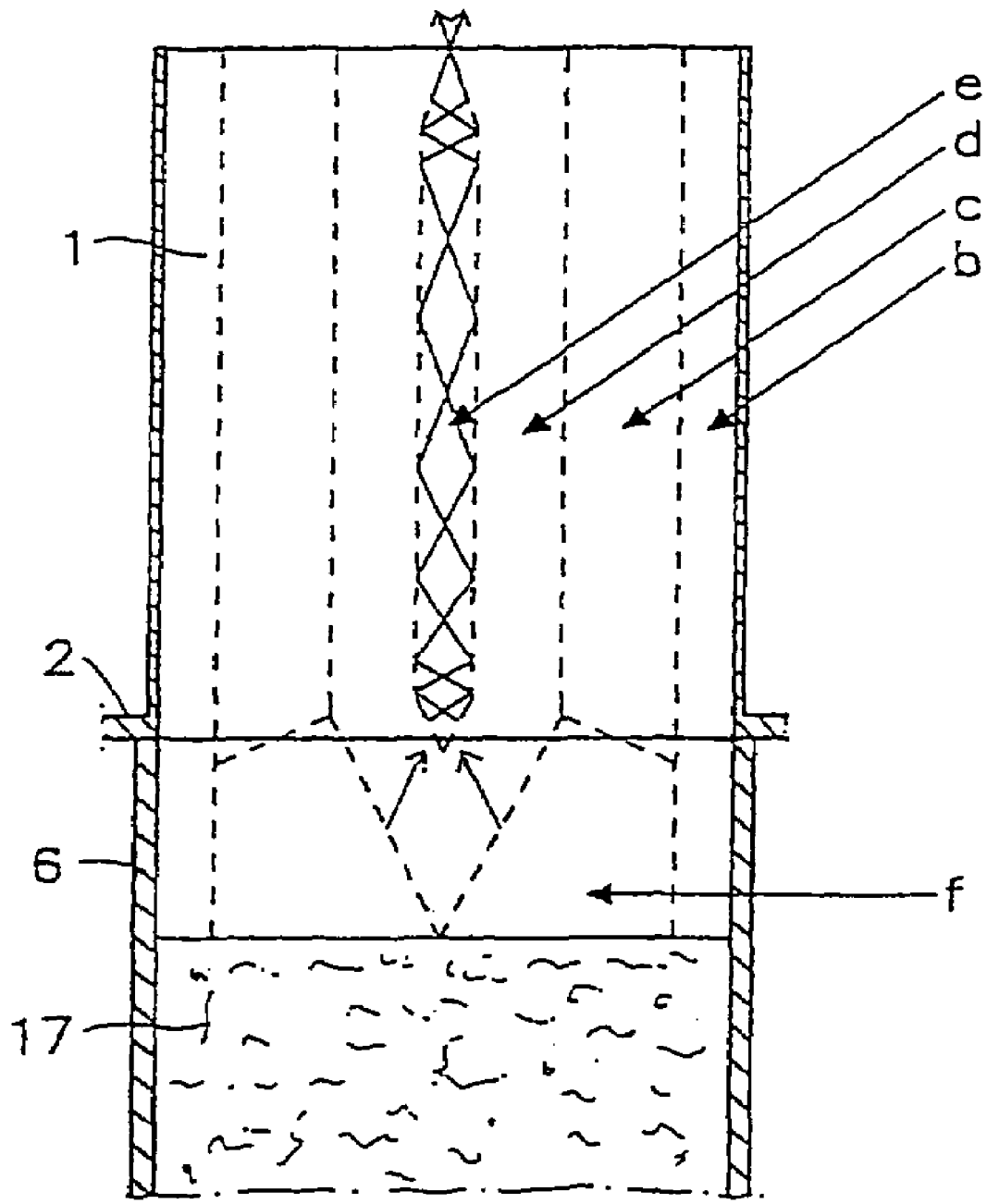
FIG. 4e is a longitudinal sectional view of a portion of the furnace with the exhaust air-flow in e part of the furnace being shown.

Reference should now be made to the drawings, in which the same reference numerals are used throughout the different drawings to designate the same components.

In order to accomplish a centrifugal combustion method according to the present invention, provided is a furnace 50, comprising a flange 2 positioned around a lower part of a cylindrical first combustion chamber 1 and outwardly protruded from the first combustion chamber 1; an upper and a lower outer tub 3 and 4 firmly set over and under the flange 2, respectively; a fuel tank 6 positioned under the first combustion chamber 1, while an upper side of the fuel tank 6 being opened and in close contact with a bottom of the flange 2 of the first combustion chamber 1, and a lower side of the fuel tank 6 being combined with a hydraulic jack 5 for attaching/detaching the fuel tank 6; a flange 9 outwardly protruded from a lower part of a second combustion chamber 8 having an exhaust tub 7 positioned on an upper side thereof, and positioned on an upper part of the upper outer tub 3; one or plural ventilator(s) 11 connected to an air supply pipe 10 which is tangentially connected to the lower part of the upper outer tub 3, and connected through an air connection pipe 13 to an air suction pipe 12 which is connected to the upper part of the lower outer tub 4 such that the ventilator 11 is communicated with the air suction pipe 12; an air direction control plate 14 positioned on an upper part of a space between the first combustion chamber 1 and the upper outer tub 3, and positioned at the upper part. of the upper outer tub 3; and a plurality of air-flow control devices 16 positioned at the upper part of the upper outer tub 3, and each consisting of an air direction control plate 14 and a control rod 15 rotatably combined with the air direction control plate.

In addition, the furnace 50 according to the present invention comprises an opening/shutting door positioned at the lower outer tub 4 covering the fuel tank 6, through which entrance and exit of the fuel tank 6 is allowed, and a plurality of rollers firmly set on a bottom of the fuel tank 6 for transporting the fuel tank 6 by use of rails, even though the opening/shutting door and rollers are not shown in drawings.

According to the present invention, a centrifugal combustion method using air-flow in a furnace, comprises the steps of firstly preheating cool air by absorbing a caloric heat from an exterior wall of a fuel tank 6, and therefore, cooling the wall of the fuel tank 6, in which ventilator noise is reduced by sucking the cool air through a space between the fuel tank 6 and a lower outer tub 4; supplying the firstly preheated air into a space formed between a first combustion chamber 1 and an upper outer tub 3 through a ventilator 11 which is tangentially connected to a lower part of the lower outer tub 4 to make the supplied air ascend and revolve in the space formed between a first combustion chamber 1 and an upper outer tub 3, in which the firstly preheated air absorbs a caloric heat of the first combustion chamber 1 and simultaneously cools the exterior wall of the first combustion chamber 1 while ascending and revolving at high speed; controlling the amount of the secondly preheated air which ceases to ascend because a flange 9 positioned at a lower part of the second combustion chamber 8 obstructs the ascending of the secondly preheated air by controlling the angle of an air-flow control device 16; thirdly preheating the secondly preheated air supplied into the first combustion chamber, in which the secondly preheated air descends down to the fuel tank with revolving in contact with an interior wall of the first combustion chamber 1 due to the centrifugal force caused by the revolution of the air-flow which is continued still in the first combustion chamber, absorbs caloric heat from the interior wall of the first combustion chamber and therefore cools the interior walls of the first combustion chamber 1 and the fuel tank 6.

By taking the steps mentioned in the above, the thirdly preheated air is mixed with fuel in the fuel tank 6 forming a mixed ignition combustive sector f, and the resulting mixture revolves and is combusted therein. High gravity combustibles incompletely combusted in the mixed ignition combustive section f are swept into the thirdly preheated air b which is descending down in the first combustion chamber 1 forming a high gravity combustive sector c, in which they are combusted in a sufficiently long combustion distance and a lengthy period of combustion time. Low gravity combustibles incompletely combusted in the high combustive sector c are transferred into a center of the first combustion chamber 1 forming a low gravity high temperature combustive sector d, in which they are collected, combusted more and ascend to the second combustion chamber 8 while revolving and being combusted. A high temperature heat core sector e is formed at the center of the furnace, the temperature of which is maximized in the furnace.

Incompletely combusted combustibles in the low gravity high temperature combustive sector d and the high temperature heat core sector e are swept again into the descending and revolving thirdly preheated air b in the first combustion chamber 1 due to their high gravity and the centrifugal force of the revolving air-flow, and therefore supplied again into the low gravity high temperature combustive sector d or the high temperature heat core sector e together with the thirdly preheated air b.

Some combustibles incompletely combusted in the first combustion chamber 1 and transferred to the second combustion chamber 8 with the air-flow ascending up from the central parts of the first combustion chamber 1 are combusted again by the secondly preheated air a ascending through the air-flow control device 16. The secondly preheated air absorbs a caloric heat from the interior wall of the second combustion chamber 8, and therefore cools the wall. Finally, according to this invention, only combustion gas, namely the combustibles completely combusted are emitted through an exhaust tub 7.

The furnace 50 is operated, as follows.

After fuel 17 filled in the fuel tank 6 is ignited by a hand or automatic ignition device, an upper side of the fuel tank 6 is closely attached to a bottom of the flange 2 positioned at a lower part of the first combustion chamber 1 through a hydraulic jack 5 for attaching/detaching the fuel tank 6. Next, a caloric heat is produced during mixing of fuel with air and combusting of the resulting mixture in the fuel tank 6, and the exterior wall of the fuel tank 6 is cooled and cool air 5 supplied through a bottom of the lower outer tub 4 is firstly preheated while the cool air flows through a space between the fuel tank 6 and the lower outer tub 4, by operating the ventilator 11 at high speed. The firstly preheated air g is tangentially supplied through the ventilator 11 into a space between the first combustion chamber 1 and the upper outer tub 3 and ascends by revolving at high speed. At this time, firstly preheated air g supplied by the ventilator 11 absorbs the caloric heat of the first combustion chamber 1 to be changed into a secondly preheated high temperature air a, as well as cools an exterior wall of the first combustion chamber 1. When air ascending by revolving in a space between the first combustion chamber 1 and the upper outer tub 3 reaches a bottom of the flange 9 of the second combustion chamber 8, the air does not ascend any more because the flange 9 obstructs ascending of the air, and the amount of air supplied into the first combustion chamber 1 and the second combustion chamber 8 can be controlled by an angle of an air direction control plate 14, which is positioned under the flange 9 of the second combustion chamber 8, changed with rotation of control rods 15 of air-flow control devices 16.

Because polymer based high-calorie wastes such as waste vinyl, waste plastic, and waste tires have many volatile components and rapidly decompose, when the polymer based high-calorie wastes are in contact with high temperature air, a temperature of combustibles is increased and thus sooty smoke is produced due to an incomplete combustion, in conjunction with an explosive combustion. At this time, if the air direction control plate 14 of the air-flow control device 16 is, for example, at an angle of 135° with a revolution direction of air (as shown in drawings), the amount of secondly preheated high temperature air a descending to the first combustion chamber 1 is reduced and a combustion rate becomes slow, thereby preventing the explosive combustion. In addition, substances incompletely combusted in the first combustion chamber 1 are completely combusted with secondly preheated sufficiently high temperature air by increasing the amount of air supplied into the second combustion chamber 8.

On the other hand, when the air direction control plate 14 of the air-flow control device 16 is, for example, at an angle of 45° with a revolution direction of air, the amount of air supplied to the first combustion chamber 1 is increased and the amount of air supplied to the second combustion chamber 8 is decreased. In other words, a combustion rate, a combustion temperature, and a required heat capacity per hour can be controlled by the air-flow control device 16.

Air supplied to the first combustion chamber 1 is not diffused to a center of the first combustion chamber 1 because of the centrifugal force which is due to a continuous revolution of air, but descends into the fuel tank 6 storing fuel 17 while revolving in close contact with the interior wall of the first combustion chamber 1. At this time, the air supplied to the first combustion chamber 1 cools the interior wall of the first combustion chamber 1, which is heated by radiation heat from the high gravity combustive sector c, the low gravity high temperature combustive sector d, and the high temperature heat core sector in the first combustion chamber 1, and is simultaneously changed into the thirdly preheated high temperature air b.

Thirdly preheated high temperature air b supplied to the fuel tank 6 is revolved at high speed and mixed with fuel 17, the resulting mixture is then combusted in the mixed ignition combustive sector f before it is transferred to a center of the first combustion chamber 1. At this time, high temperature atoms or molecules are transferred to the low gravity high temperature combustive sector d and high temperature heat core sector 2 which is a maximum temperature in the first combustion chamber 1, and ascend while revolving in high temperature and high speed, thereby the mixture of the thirdly preheated air b with fuel 17 is completely combusted.

Additionally, high gravity combustibles are transferred to the high gravity combustible sector c closer to the center of the first combustion chamber 1 than thirdly preheated airflow b, revolves in high speed at high temperature, and are combusted while securing a sufficiently long combustion distance and time. Combusted combustibles become greatly reduced in gravity to the extent of approaching zero, and are transferred to the low gravity high temperature combustive sector d and the high temperature heat core sector e to be completely combusted at high speed and at high temperature.

Meanwhile, combustibles not thermally decomposed in the low gravity high temperature combustive sector d and the high temperature heat core sector e. descend due to the weight of the combustible, and are transferred to the thirdly preheated air-flows b and again combusted, thereby the combustible is completely combusted.

Remains incompletely combusted in the first combustion chamber 1 are completely combusted with secondly preheated high temperature air-flow a ascending through the air-flow control device 16 in the second combustion. chamber 8, which simultaneously cools the interior wall of the second combustion chamber 8, thus nonpolluting combustion gas is emitted through an exhaust tub 7.

Furthermore, because the lower outer tub 4 is positioned outside of the fuel tank 6 in such a way that a space is formed between the fuel tank 6 and the lower outer tub 4, cool air sucked by the ventilator 11 and passing through the space between the fuel tank 6 and the lower outer tub 4 cools the exterior wall of the fuel tank 6, and simultaneously absorbs the caloric heat of the fuel tank 6 to be preheated. In addition, because the space between the fuel tank 6 and the lower outer tub 4 acts as a suction path, and the cool air passing through the space is firstly preheated before being supplied into the ventilator 11, noise from the ventilator 11 is reduced, in comparison with the conventional ventilator which sucks cool air directly from the atmosphere.

After polymer based high-calorie wastes such as waste vinyl, waste plastic, waste tires, and waste oil was incinerated according to the centrifugal combustion method of the present invention, a temperature distribution in the furnace 50 was measured to be 100 to 200° C. in the secondly preheated air a, 300 to 500° C. in the thirdly preheated air b, 1000 to 1200° C. in the mixed ignition combustive sector f, 1200 to 1400° C. in the high gravity combustive sector c, 1300 to 1500° C. in the low gravity high temperature combustive sector d, and 1500 to 1900° C. in the high temperature heat core sector e.

Therefore, the present invention provides a centrifugal combustion method, characterized in that toxic substances fatal to humans such as dioxins are completely decomposed at high temperature and only nonpolluting gas is emitted to the atmosphere because only combustion gas of 1300° C. or higher thermally decomposed in the low gravity high temperature combustive sector d and the high temperature heat core sector e is emitted.

INDUSTRIAL APPLICABILITY

As described above, the present invention provides a centrifugal combustion method, in which combustibles can be completely combusted at high temperature by supplying air through a ventilator into a furnace without any separate auxiliary device or auxiliary fuel and by dividing a space in the furnace into many combustive sectors with the use of a centrifugal force due to high speed revolution of air. The centrifugal combustion method of the present invention has advantages in that although materials of the furnace are not special refractory materials but metals, the furnace can be durably used without a conventional special burner capable of enduring high speed and temperature combustion, supplying of oxygen under high pressure, and a firebrick used to protect the wall of the furnace because a caloric heat is absorbed by preheated air-flow revolving in high speed around an interior and an exterior wall of a first combustion chamber, and around interior walls of a fuel tank and a second combustion chamber and thus excessive of heating of the fuel, the first and the second combustion chamber, and the upper and the lower outer tub are prevented.

Other advantages of the present invention are that size and weight of the furnace according to the present invention are reduced by two times or more in comparison with a conventional furnace because a structure is simple and a high temperature and high speed combustion is realized, inflammable substances not usually suitable for incineration can be rapidly incinerated, a boiler used in a vinyl house or bathhouse reutilizes a complete combustion heat in order to save energy, and construction and operational costs of a sanitary landfill are saved because completely combusted gas is emitted from the incineration furnace in order to avoid polluting an environment.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A centrifugal combustion method using air-flow in a furnace, comprising the steps of:
    supplying air to a space formed between a first combustion chamber positioned at an upper part of a fuel tank and an outer tub wrapping said first combustion chamber through one or more ventilators tangentially connected to a lower part of said outer tub such that the air supplied through said ventilators is preheated and ascended with revolving inside of said space formed between said first combustion chamber and said outer tub; and,
    controlling the direction of the air-flow that ascended to the top of said space formed between said first combustion chamber and said outer tub so that the necessary amount of air descends inside of said first combustion chamber with revolving in contact with an interior wall of said first combustion chamber, and the remaining part of said air further ascends inside of a second combustion chamber located at an upper part of said first combustion chamber with revolving in contact with an interior wall of said second combustion chamber, the revolving of said air in contact with said interior walls of said combustion chambers being accomplished by the continuous supply of the air by said ventilators.

2. The method according to claim 1, further comprising the step of preheating the air in a space formed between said fuel tank and a lower outer tub wrapping said fuel tank before being supplied into the space formed between said first combustion chamber and said outer tub through said ventilators.

3. The method according to claim 1, further comprising the step of controlling a combustion rate, a combustion temperature, and a required heat capacity per hour with said air-flow control devices that comprise an air direction control plate positioned at the upper part of the space between the first combustion chamber and the outer tub, and a control rod rotatably combined with said air direction control plate.

4. A centrifugal combustion furnace using air-flow comprising:
    a cylindrical first combustion chamber;
    a cylindrical second combustion chamber positioned over said first combustion chamber;
    a cylindrical exhaust tub positioned over said second combustion chamber;
    a fuel tank positioned under the first combustion chamber;
    an outer tub wrapping said first combustion chamber such that a space is formed between said outer and said first combustion chamber;
    one or more ventilators tangentially connected to a lower part of said outer tub such that the air supplied by said ventilators ascends with revolving in the space formed between said first combustion chamber and said outer tub; and
    one or more air-flow control devices positioned at an upper part of said space to control the direction of the ascended air-flow;
    a lower outer tub wrapping said fuel tank such that a space is formed between said lower outer tub and said fuel tank;
    a flange positioned outwardly around the lower part of said first combustion chamber dividing the space formed between said outer tub and said first combustion chamber and the space formed between said lower outer tub and said fuel tank; and
    one or more air pipes connecting said ventilators and the space formed between said lower outer tub and said fuel tank.

* * * * *

UNITED STATES PATENT AND TRADEMARK OFFICE
CERTIFICATE OF CORRECTION

PATENT NO.        : 6,966,268 B2  
APPLICATION NO. : 10/432450  
DATED              : November 22, 2005  
INVENTOR(S)       : Kim It is certified that error appears in the above-identified patent and that said Letters Patent is hereby corrected as shown below:

Face of the Patent, See Item (57) ABSTRACT, Lines 1-2, "This invention. Centrifugal and Divided Space combustion method, need to install" should read:
-- This invention relates to a need to install --

Signed and Sealed this

First Day of August, 2006

JON W. DUDAS  
*Director of the United States Patent and Trademark Office*